(12) United States Patent
Kato

(10) Patent No.: US 9,843,071 B2
(45) Date of Patent: Dec. 12, 2017

(54) ALL-SOLID-STATE BATTERY AND METHOD FOR MANUFACTURING THE SAME

(75) Inventor: Kazuhito Kato, Suntou-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 311 days.

(21) Appl. No.: 14/405,231

(22) PCT Filed: Jul. 11, 2012

(86) PCT No.: PCT/JP2012/067696
§ 371 (c)(1),
(2), (4) Date: Dec. 3, 2014

(87) PCT Pub. No.: WO2014/010043
PCT Pub. Date: Jan. 16, 2014

(65) Prior Publication Data
US 2015/0147659 A1    May 28, 2015

(51) Int. Cl.
*H01M 10/056* (2010.01)
*H01M 10/0562* (2010.01)
(Continued)

(52) U.S. Cl.
CPC ....... *H01M 10/0562* (2013.01); *H01M 4/049* (2013.01); *H01M 10/0525* (2013.01); *H01M 2300/0068* (2013.01); *Y10T 29/49115* (2015.01)

(58) Field of Classification Search
CPC ................................................ H01M 10/0562
See application file for complete search history.

(56) References Cited

U.S. PATENT DOCUMENTS

| 6,656,309 B1 | 12/2003 | Parker et al. |
| 2002/0018939 A1 | 2/2002 | Kugai et al. |

(Continued)

FOREIGN PATENT DOCUMENTS

| CN | 101076914 A | 11/2007 |
| CN | 101911369 A | 12/2010 |

(Continued)

OTHER PUBLICATIONS

Mar. 30, 2016 Office Action Issued in U.S. Appl. No. 14/118,332.
(Continued)

*Primary Examiner* — Jonathan Crepeau
(74) *Attorney, Agent, or Firm* — Oliff PLC

(57) ABSTRACT

An all-solid-state battery including a cathode layer, an anode layer, and an electrolyte layer arranged between the cathode layer and the anode layer, the electrolyte layer including a first solid electrolyte layer including a sulfide solid electrolyte, and a second solid electrolyte layer other than the first solid electrolyte layer, the electrolyte layer including the sulfide solid electrolyte. Also provided is a method for manufacturing an all-solid-state battery including the steps of (a) making a cathode layer, (b) making an anode layer, (c) making an electrolyte layer including a first solid electrolyte layer including a sulfide solid electrolyte and a second solid electrolyte including the sulfide solid electrolyte, and (d) layering the cathode layer, the electrolyte layer, and the anode layer, such that the electrolyte layer is arranged between the cathode layer and the anode layer.

8 Claims, 4 Drawing Sheets

(51) Int. Cl.
H01M 4/04 (2006.01)
H01M 10/0525 (2010.01)

(56) References Cited

U.S. PATENT DOCUMENTS

| | | | |
|---|---|---|---|
| 2007/0015060 A1* | 1/2007 | Klaassen | H01B 1/122 |
| | | | 429/309 |
| 2007/0048617 A1 | 3/2007 | Inda | |
| 2010/0151335 A1* | 6/2010 | Senga | H01B 1/122 |
| | | | 429/322 |
| 2010/0273062 A1* | 10/2010 | Tsuchida | H01M 4/131 |
| | | | 429/304 |
| 2011/0123868 A1 | 5/2011 | Kawaoka et al. | |
| 2011/0177397 A1 | 7/2011 | Ogasa | |
| 2012/0094185 A1 | 4/2012 | Tsuchida et al. | |
| 2012/0115018 A1 | 5/2012 | Kawaoka et al. | |
| 2012/0225351 A1 | 9/2012 | Kojima | |
| 2013/0260258 A1 | 10/2013 | Tsuchida et al. | |
| 2014/0150961 A1 | 6/2014 | Hama et al. | |

FOREIGN PATENT DOCUMENTS

| | | |
|---|---|---|
| CN | 101971407 A | 2/2011 |
| JP | 2001-351615 | 12/2001 |
| JP | A-2001-351615 | 12/2001 |
| JP | 3453099 | 10/2003 |
| JP | A-3453099 | 10/2003 |
| JP | 2004-206942 | 7/2004 |
| JP | A-2004-206942 | 7/2004 |
| JP | 2007-066703 | 3/2007 |
| JP | A-2007-066703 | 3/2007 |
| JP | 2008-091328 | 4/2008 |
| JP | A-2008-091328 | 4/2008 |
| JP | 2008-135287 A | 6/2008 |
| JP | 2009-301959 | 12/2009 |
| JP | A-2009-301959 | 12/2009 |
| JP | 2010-282948 | 12/2010 |
| JP | A-2010-282948 | 12/2010 |
| JP | 2011-150817 | 8/2011 |
| JP | A-2011-150817 | 8/2011 |
| WO | 2011/064842 A1 | 6/2011 |
| WO | WO 2012/077225 A1 | 6/2012 |
| WO | WO 2013/014759 A1 | 1/2013 |

OTHER PUBLICATIONS

Sep. 11, 2015 Office Action issued in U.S. Appl. No. 14/118,332.
Jun. 7, 2016 Notice of Allowance issued in U.S. Appl. No. 14/118,332.
U.S. Appl. No. 14/118,332 in the name of Shigenori Hama et al. filed Nov. 18, 2013.
Oct. 23, 2012 Search Report issued in Japanese Patent Application No. PCT/2012/067696.

\* cited by examiner

ALL-SOLID-STATE BATTERY AND METHOD FOR MANUFACTURING THE SAME

BACKGROUND OF THE INVENTION

Field of the Invention

The present invention relates to an all-solid-state battery and a method for manufacturing the all-solid-state battery.

Description of the Related Art

A lithium-ion secondary battery has a higher energy density and is operable at a high voltage compared to conventional secondary batteries. Therefore, it is used for information devices such as a cellular phone, as a secondary battery which can be easily reduced in size and weight, and nowadays there is also an increasing demand for the lithium-ion secondary battery to be used as a power source for large-scale apparatuses such as electric vehicles and hybrid vehicles.

The lithium-ion secondary battery includes a cathode layer, an anode layer, and an electrolyte layer arranged between them. An electrolyte to be used in the electrolyte layer is, for example, a non-aqueous liquid or a solid. When the liquid is used as the electrolyte (hereinafter, the liquid being referred to as "electrolytic solution"), it easily permeates into the cathode layer and the anode layer. Therefore, an interface can be easily formed between the electrolytic solution and active materials contained in the cathode layer and the anode layer, and the battery performance can be easily improved. However, since commonly used electrolytic solutions are flammable, it is necessary to have a system to ensure safety. On the other hand, if a nonflammable solid electrolyte (hereinafter referred to as "solid electrolyte") is used, the above system can be simplified. As such, a lithium-ion secondary battery provided with a layer containing a solid electrolyte has been suggested (hereinafter, the layer being referred to as "solid electrolyte layer" and the battery being referred to as "all-solid-state battery").

As a technique related to such a lithium-ion secondary battery, for example Patent Document 1 discloses an all-solid-state battery including a cathode layer including a transition metal element, a solid electrolyte layer, and an anode layer including lithium. Patent Document 2 discloses a technique related to an anode of a lithium-ion secondary battery in which a first inorganic solid electrolyte film is formed on a metal including a lithium metal or lithium, and a second inorganic solid electrolyte film is further formed on the first inorganic solid electrolyte film, the technique of making a ratio b/a larger than 0.5 wherein a is a thickness of the first inorganic solid electrolyte film, and b is a thickness of the second inorganic solid electrolyte film. Patent Document 2 describes that the composition of the second inorganic solid electrolyte film is preferably a composition including a component which is other than sulfide and included in the first inorganic solid electrolyte film, and that the first inorganic solid electrolyte film and the second inorganic solid electrolyte film are formed by means of a sputtering method. Patent Document 3 discloses a technique of providing a cathode, an anode, and a solid electrolyte layer arranged between the cathode and the anode, the technique of providing the solid electrolyte layer including a powder compacted portion wherein powder of the first solid electrolyte is compacted, and a surface vapor disposition film wherein a second solid electrolyte is accumulated on at least either one surface of the surface on a cathode side and the surface on an anode side, by means of a vapor phase method. Patent Document 3 describes that the materials of the first solid electrolyte and the second solid electrolyte may be of a same kind or different. Patent Document 4 discloses an all-solid-state battery having a structure in which at least two or more layers are layered, wherein the thickest layer in the layered electrolyte includes a solid electrolyte film including a lithium-ion conductive crystal. Patent Document 4 describes that the electrolyte layer which does not include the lithium-ion conductive crystal or includes a small amount of the lithium-ion conductive crystal is made to have a thickness of 50 μm or less, and that since the electrolyte layer has a low intensity, there is a large possibility of causing a short circuit between the electrodes if it is made thin, and thus a sufficient thickness is required in a case where a single layer is applied.

CITATION LIST

Patent Literatures

Patent Document 1: Japanese Patent Application Laid-Open No. 2008-91328
Patent Document 2: Japanese Patent Application Laid-Open No. 2001-351615
Patent Document 3: Japanese Patent Application Laid-Open No.
Patent Document 4: Japanese Patent Application Laid-Open No. 2007-66703

SUMMARY OF THE INVENTION

Problems to be Solved by the Invention

With the technique disclosed in Patent Document 1, if the thickness of the solid electrolyte layer is made to be thin in order to improve the volume energy density and to reduce the resistance, problems are created that holes (pinholes) are easily made to the solid electrolyte layer thereby easily causing a short circuit. Even though the thickness is made to satisfy b/a>0.5 by means of the technique disclosed in Patent Document 2 in order to prevent the short circuit, with the technique disclosed in Patent Document 2, the resistance generated when ions transfer at the interface of the first inorganic solid electrolyte film and the second inorganic solid electrolyte film is easily increased, since it is assumed that the solid electrolyte for the second inorganic solid electrolyte film is a different substance from the solid electrolyte for the first inorganic solid electrolyte film. Also, as disclosed in Patent Documents 2 and 3, if the solid electrolyte layer is made by means of a vapor phase growth method, since a vapor phase growth apparatus is expensive, the manufacturing cost is easily increased, and the productivity is easily degraded. With the technique disclosed in Patent Document 4, since a plurality of solid electrolyte layers have different content of the lithium-ion conductive crystals from each other, the resistance generated when ions transfer at the interface between the adjacent solid electrolyte layers is easily increased.

Accordingly, an object of the present invention is to provide an all-solid-state battery capable of inhibiting a short circuit together with reducing resistance, and a method for manufacturing the all-solid-state battery.

Means for Solving the Problems

In order to improve productivity together with reducing manufacturing cost, in a case where an electrolyte layer having a multilayer structure (for example, an electrolyte layer having a first solid electrolyte layer and a second solid electrolyte layer) is made with a sulfide solid electrolyte powder, if the first solid electrolyte layer and the second solid electrolyte layer are thinly made, pinholes are easily formed. However, as a result of an intensive study, the inventor of the present invention has found out that: even though pinholes are formed to the first solid electrolyte layer and the second solid electrolyte layer, there is very little possibility that the pinhole formed to the first solid electrolyte layer and the pinhole formed to the second solid electrolyte layer are connected such that the pinholes pass through a thickness direction of the electrolyte layers. Further, as a result of an intensive study, the inventor of the present invention has also found out that: in a case where the electrolyte layers thinly formed in order to reduce the resistance and to inhibit a short circuit is made to have a multilayer structure, it becomes easy to reduce the resistance by using a same sulfide solid electrolyte for all of the solid electrolyte layers that form the electrolyte layer. The present invention has been made based on the above findings.

In order to solve the above problems, the present invention takes the following means. Namely, the first aspect of the present invention is an all-solid-state battery including: a cathode layer; an anode layer; and an electrolyte layer arranged between the cathode layer and the anode layer, the electrolyte layer including: a first solid electrolyte layer including a sulfide solid electrolyte; and a second solid electrolyte layer other than the first solid electrolyte layer, the second solid electrolyte layer including the sulfide solid electrolyte.

Here, the expression "the second solid electrolyte layer other than the first solid electrolyte layer" means that the first solid electrolyte layer and the second solid electrolyte layer are different layers made in two layers. The electrolyte layer in the present invention has a multilayer structure including the first solid electrolyte layer and the second solid electrolyte layer. By having a configuration in which the first solid electrolyte layer and the second solid electrolyte layer are arranged between the cathode layer and the anode layer, even though both of the first solid electrolyte layer and the second solid electrolyte have pinholes, there is little possibility that the pinhole of the first solid electrolyte layer and the pinhole of the second solid electrolyte layer are connected in a thickness direction of the electrolyte layer. Therefore, it is possible to inhibit a short circuit. Further, by having a configuration in which a same sulfide solid electrolyte is used for the first solid electrolyte layer and the second solid electrolyte layer, it becomes possible to reduce the ion conductivity resistance generated when ions transfer at the interface of the first solid electrolyte layer and the second solid electrolyte layer, compared to a case where different solid electrolytes are used between the first solid electrolyte layer and the second solid electrolyte layer. Therefore, this configuration makes it possible to inhibit a short circuit together with reducing the resistance of the all-solid-state battery.

Also, in the first aspect of the present invention, the sulfide solid electrolyte may be a powder. Even if a sulfide solid electrolyte powder is used for the first solid electrolyte layer and the second solid electrolyte layer, it is possible to inhibit a short circuit together with reducing the resistance.

Also, in the first aspect of the present invention in which the sulfide solid electrolyte powder is used, it is preferable that the first solid electrolyte layer and/or the second solid electrolyte layer include a binder. By using a binder with the sulfide solid electrolyte powder, it becomes easy to evenly arrange the sulfide solid electrolyte powder in the solid electrolyte layers. Therefore, by including the sulfide solid electrolyte powder and the binder to either one or both of the first solid electrolyte layer and the second solid electrolyte layer, it becomes easy to inhibit a short circuit.

Also, in the first aspect of the present invention in which the sulfide solid electrolyte powder is used, it is preferable that $X/Y \leq 0.5$, wherein X is the average particle diameter D50 of the sulfide solid electrolyte, and Y is the thickness of the electrolyte layer. For example by determining the average particle diameter of the sulfide solid electrolyte depending on the thickness of the electrolyte layer, it becomes easy to inhibit a short circuit.

A second aspect of the present invention is a method for manufacturing an all-solid-state battery, the method including the steps of: (a) making a cathode layer; (b) making an anode layer; (c) making an electrolyte layer including: a first solid electrolyte layer including a sulfide solid electrolyte; and a second solid electrolyte layer including the sulfide solid electrolyte; and (d) layering the cathode layer, the electrolyte layer, and the anode layer, such that the electrolyte layer is arranged between the cathode layer and the anode layer.

According to the second aspect of the present invention, the all-solid-state battery according to the first aspect of the present invention can be manufactured. Therefore, it is possible to provide a method for manufacturing an all-solid-state battery capable of manufacturing an all-solid-state battery which can inhibit a short circuit together with reducing the resistance.

Also, in the second aspect of the present invention, the sulfide solid electrolyte may be a powder. Even if a sulfide solid electrolyte powder is used for the first solid electrolyte layer and the second solid electrolyte layer, it becomes possible to inhibit a short circuit together with reducing the resistance.

Also, in the second aspect of the present invention in which the sulfide solid electrolyte powder is used, it is preferable that a binder is used when making the first solid electrolyte layer and/or when making the second solid electrolyte layer. By using the binder with the sulfide solid electrolyte powder, it becomes easy to evenly arrange the sulfide solid electrolyte powder in the solid electrolyte layer. Therefore, by including the binder with the sulfide solid electrolyte powder to either one or both of the first solid electrolyte layer and the second solid electrolyte layer, it becomes easy to inhibit a short circuit.

Also, in the second aspect of the present invention in which the sulfide solid electrolyte powder is used, it is preferable that the average particle diameter D50 of the sulfide solid electrolyte and/or the thickness of the electrolyte layer are adjusted such that $X/Y \leq 0.5$, wherein X is the average particle diameter D50 of the sulfide solid electrolyte, and Y is the thickness of the electrolyte layer after the step (d).

Here, the expression "the average particle diameter D50 of the sulfide solid electrolyte is adjusted such that $X/Y \leq 0.5$" means that: for example in a case where the thickness of the electrolyte layer is determined before the all-solid-state battery is manufactured, the first solid electrolyte layer and the second solid electrolyte layer are made with the sulfide solid electrolyte powder having an average particle diameter D50 which satisfies $X/Y \leq 0.5$. Also, the expression "the thickness of the electrolyte layer is adjusted such that $X/Y \leq 0.5$" means: for example in a case where the average particle diameter D50 of the sulfide solid electrolyte powder used for the all-solid-state battery is determined, the production conditions and pressing conditions of the electrolyte layer are adjusted so that the thickness of the electrolyte layer satisfies X/Y≤0.5. By adjusting either one or both of the average particle diameter D50 of the sulfide solid electrolyte and the thickness of the electrolyte layer so that X/Y≤0.5 is satisfied, it becomes easy to inhibit a short circuit.

Effects of the Invention

According to the present invention, it is possible to provide an all-solid-state battery capable of inhibiting a short circuit and a method for manufacturing the all-solid-state battery.

DETAILED DESCRIPTION OF THE INVENTION

Hereinafter, the present invention will be described with reference to the drawings. It should be noted that the embodiments shown below are examples of the present invention, and the present invention is not limited to the embodiments.

1. All-Solid-State Battery

Figure 1:
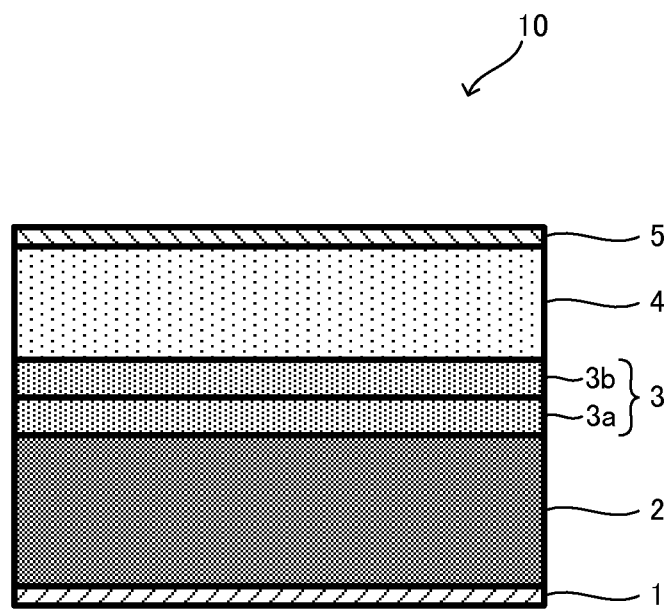
FIG. 1 is a view to explain an all-solid-state battery 10.

FIG. 1 is a view to explain an all-solid-state battery 10 of the present invention. In FIG. 1, the description of the housing to house the battery cell and the like is omitted. The all-solid-state battery 10 shown in FIG. 1 includes an anode current collector 1, a cathode current collector 5, an anode layer 2 formed to the anode current collector 1, a cathode layer 4 formed to the cathode current collector 5, and an electrolyte layer 3 arranged between the anode layer 2 and the cathode layer 4. The electrolyte layer 3 includes a first solid electrolyte layer 3a, and a second solid electrolyte layer 3b in contact with the first solid electrolyte 3a. The first solid electrolyte layer 3a is in contact with the anode layer 2 and the second solid electrolyte layer 3b, and the second solid electrolyte layer 3b is in contact with the first solid electrolyte layer 3a and the cathode layer 4.

The first solid electrolyte layer 3a includes a sulfide solid electrolyte powder and a binder. Defining the average particle diameter D50 of the sulfide solid electrolyte included in the first solid electrolyte layer 3a as X, and the thickness (the thickness in the vertical direction in the FIG. 1. The same is applied hereinafter) of the electrolyte layer 3 as Y, X and Y satisfy X/Y≤0.5.

The second solid electrolyte layer 3b includes a binder and the same sulfide solid electrolyte as the sulfide solid electrolyte powder used for the first solid electrolyte layer 3a.

As shown in FIG. 1, the electrolyte layer 3 provided to the all-solid-state battery 10 includes a plurality of solid electrolyte layers (the first solid electrolyte layer 3a and the second solid electrolyte layer 3b). With this configuration, even if a pinhole is supposedly formed to each of the first solid electrolyte layer 3a and the second solid electrolyte layer 3b, there is very little possibility that the pinholes are connected in the thickness direction of the electrolyte layer 3. Therefore, according to the all-solid-state battery 10, it is possible to inhibit a short circuit.

Also, in the all-solid-state battery 10, a same sulfide solid electrolyte is used for the first solid electrolyte layer 3a and the second solid electrolyte layer 3b. This makes it possible to reduce the ion conductivity resistance generated when ions transfer at the interface of the first solid electrolyte layer 3a and the second solid electrolyte layer 3b, compared to a case where different solid electrolytes are used between the first solid electrolyte layer 3a and the second solid electrolyte layer 3b. Therefore, according to the all-solid-state battery 10, it is possible to reduce the resistance.

Further, in the all-solid-state battery 10, a binder is used with the sulfide solid electrolyte powder to each of the first solid electrolyte layer 3a and the second solid electrolyte layer 3b. This makes it possible to evenly arrange (disperse) the sulfide solid electrolyte powder to each of the first solid electrolyte layer 3a and the second solid electrolyte layer 3b, whereby it is possible to reduce variation in the ion conductivity resistance in a direction intersecting to the thickness direction. By reducing the variation in the ion conductivity resistance, it is possible to reduce the resistance of the all-solid-state battery 10.

In addition, in the all-solid-state battery 10, X and Y satisfy X/Y≤0.5. This makes it possible to arrange a plurality of particles of the sulfide solid electrolyte in the thickness direction of the electrolyte layer 3, whereby it becomes easy to inhibit a short circuit.

As described above, according to the all-solid-state battery 10, it is possible to inhibit a short circuit together with reducing the resistance.

In the present invention, for the sulfide solid electrolyte to be included in the first solid electrolyte layer and the second solid electrolyte layer, a known sulfide solid electrolyte which can be used for an all-solid-state battery may be adequately used. Examples of the sulfide solid electrolyte include $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $Li_2S$—$P_2S_5$, $Li_3PS_4$ and the like. The sulfide solid electrolyte used for the present invention may be crystalline, amorphous, or a glass ceramics.

Also, in the present invention, in a case where the sulfide solid electrolyte powder is used for the sulfide solid electrolyte to be included in the first solid electrolyte layer and the second solid electrolyte layer, its average particle diameter D50 is not particularly limited. However, in view of having a configuration in which a short circuit is easily inhibited, it is preferable that X/Y≤0.5, wherein X is the average particle diameter D50 of the sulfide solid electrolyte included in the first solid electrolyte layer and the second solid electrolyte layer, and Y is the thickness of the solid electrolyte layer including the first solid electrolyte layer and the second solid electrolyte layer.

Also, as described above, the all-solid-state battery of the present invention can include a binder to the first solid electrolyte layer and the second solid electrolyte layer. A known binder which can be used for the solid electrolyte layer of an all-solid-state battery may be adequately used for the binder. Examples of the binder include acrylonitrile butadiene rubber (NBR), butadiene rubber (BR), polyvinylidene fluoride (PVdF), styrene butadiene rubber (SBR) and the like. In view of making it possible to form the solid electrolyte layer including the solid electrolyte evenly dispersed and prevented from an excessive aggregation in order to easily realize a high output and the like, in a case where the binder is included in the solid electrolyte layer, the amount of the binder is preferably 5% by mass or less. For example, in a case where the first solid electrolyte layer and the second solid electrolyte layer are made by going through a process of applying an electrolyte composition in a slurry form adjusted by dispersing the sulfide solid electrolyte powder and the binder in a liquid, as the liquid to disperse the sulfide solid electrolyte powder and the binder, a heptane and the like can be exemplified, and a nonpolar solvent can be preferably used. The content of the sulfide solid electrolyte in the first solid electrolyte layer and the second solid electrolyte layer is, by mass %, for example preferably 60% or more, more preferably 70% or more, and especially preferably 80% or more. The thickness of the solid electrolyte layer including the first solid electrolyte layer and the second solid electrolyte layer may be, depending on the structure of the battery, for example 5 μm or more and 30 μm or less.

As the cathode active material to be included in the cathode layer, a known cathode active material which can be used for an all-solid-state battery can be adequately used. Examples of the cathode active material include: layer type active materials such as lithium cobalt oxide ($LiCoO_2$) and lithium nickelate ($LiNiO_2$); olivine type active materials such as olivine type iron phosphate lithium ($LiFePO_4$), spinel type active materials such as spinel type lithium manganate ($LiMn_2O_4$) and the like. The cathode active material can be formed in a particle, a thin film and the like for example. The average particle diameter (D50) of the cathode active material is, for example preferably 1 nm or more and 100 μm or less, more preferably 10 nm or more and 30 μm or less. The content of the cathode active material in the cathode layer is not particularly limited, and for example 40% or more and 99% or less by mass %.

In the present invention, if necessary, not only the solid electrolyte layer but also the cathode layer can include a known sulfide solid electrolyte which can be used for an all-solid-state battery. Examples of the sulfide solid electrolyte include the above sulfide solid electrolytes which can be included in the first solid electrolyte layer and the second solid electrolyte layer. In a case where the sulfide solid electrolyte is included in the cathode layer, the mixing ratio of the cathode active material and the sulfide solid electrolyte is not particularly limited.

In a case where the cathode layer includes the sulfide solid electrolyte, in view of having a configuration in which a high resistance layer is difficult to be formed at the interface between the cathode active material and the sulfide solid electrolyte to thereby prevent increase in the battery resistance, it is preferable that the cathode active material is covered by an ion conductive oxide. Examples of a lithium ion conductive oxide to cover the cathode active material include oxides represented by the general formula $Li_xAO_y$, (A is B, C, Al, Si, P, S, Ti, Zr, Nb, Mo, Ta, or W; x and y are positive numbers). Specifically, $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, $Li_2WO_4$ and the like may be exemplified. Also, the lithium ion conductive oxide may be a composite oxide. For the composite oxide to cover the cathode active material, the above described lithium ion conductive oxides may be adequately combined. For example, $Li_4SiO_4$—$Li_3BO_3$, $Li_4SiO_4$—$Li_3PO_4$ and the like may be given. In a case where the surface of the cathode active material is covered by the ion conductive oxide, it is only necessary that the ion conductive oxide covers at least a part of the cathode active material, and the ion conductive oxide may cover the whole surface of the cathode active material. The thickness of the ion conductive oxide to cover the cathode active material is, for example preferably 0.1 nm or more and 100 nm or less, and more preferably 1 nm or more and 20 nm or less. The thickness of the ion conductive oxide can be measured by means of a transmission type electron microscope (TEM) and the like for example.

Also, a known binder which can be included in the cathode layer of an all-solid-state battery can be used for the cathode layer. As the binder, the above binders which can be included in the first solid electrolyte layer and the second solid electrolyte layer can be exemplified.

Further, a conductive material which improves conductivity may be included in the cathode layer. Examples of the conductive material which can be included in the cathode layer include carbon materials such as vapor growth carbon fiber, acetylene black (AB), Ketjen black (KB), carbon nanotube (CNT), and carbon nanofiber (CNF), and metal materials which can endure the environment in use of the all-solid-state battery. Also, for example in a case where the cathode layer is made with the cathode composition in a slurry form adjusted by dispersing the cathode active material, the sulfide solid electrolyte, the binder and the like to a liquid, heptane and the like can be exemplified as the liquid which can be used, and a nonpolar solvent is preferably used. The making method of the cathode layer is not particularly limited. For example, as the method of making the cathode layer prepared with the cathode composition, wet processes such as a doctor blade method, a die coat method, a gravure method can be given. The thickness of the cathode layer is for example preferably 0.1 μm or more and 1 mm or less, and more preferably 1 μm or more and 100 μm or less. In order to make it easy to improve the performance of the all-solid-state battery, it is preferable that the cathode layer is made by going through a process of pressing. In the present invention, the pressure in pressing the cathode layer may be approximately 400 MPa.

As the anode active material to be included in the anode layer, a known anode active material which can be used for the all-solid-state battery may be adequately used. Examples of the anode active material include carbon active materials, oxide active materials, metal active materials and the like. The carbon active materials are not particularly limited as long as they include carbon, and for example mesocarbon microbeads (MCMB), highly oriented graphite (HOPG), hard carbons, soft carbons and the like can be given. As the oxide active materials, for example $Nb_2O_5$, $Li_4Ti_5O_{12}$, SiO and the like can be given. As the metal active materials, for example In, Al, Si, Sn and the like can be given. Also, as the anode active material, lithium-containing metal active material may be used. The lithium-containing metal active material is not particularly limited, and it may be a Li metal, or a Li alloy. As the Li alloy, an alloy including Li and at least one kind selected from In, Al, Si, and Sn can be given. The anode active material can be formed in a particle, a thin film and the like for example. The average particle diameter (D50) of the anode active material is, for example preferably 1 nm or more and 100 μm or less, and more preferably 10 nm or more and 30 μm or less. The content of the anode active material in the anode layer is not particularly limited, and for example 40% or more and 99% or less by mass %.

Further, the anode layer can include the sulfide solid electrolyte, and it can also include a binder to bind the anode active material and the sulfide solid electrolyte, and a conductive material to improve conductivity. In a case where the anode layer includes the sulfide solid electrolyte, the mixing ratio of the anode active material and the sulfide solid electrolyte is not particularly limited. As the sulfide solid electrolyte, the binder, and the conductive material that can be included in the anode layer, the above described sulfide solid electrolyte, binder, conductive material and the like that can be included in the cathode layer can be exemplified. In a case where the anode layer is made with an anode composition in a slurry form adjusted by dispersing the above-described anode active material and the like to a liquid, as the liquid to disperse the anode active material and the like, heptane can be exemplified, and a nonpolar solvent can be preferably used. The making method of the anode layer is not particularly limited. The anode layer can be made by means of the same method as the making method of the cathode layer for example. The thickness of the anode layer is for example preferably 0.1 µm or more and 1 mm or less, and more preferably 1 µm or more and 100 µm or less. In order to make it easy to improve the performance of the all-solid-state battery, the anode layer is preferably made by going through a process of pressing. In the present invention, the pressure in pressing the anode layer is preferably 200 MPa or more, and more preferably approximately 400 MPa.

As a cathode current collector connected to the cathode layer and an anode current collector connected to the anode layer, a known metal which can be used for the current collector of an all-solid-state battery can be adequately used. Examples of the metal include a metal material including one or two or more elements selected from the group consisting of Cu, Ni, Al, V, Au, Pt, Mg, Fe, Ti, Co, Cr, Zn, Ge, and In.

As a housing to wrap the battery cell as shown in FIG. 1, a known laminate film which can be used for an all-solid-state battery can be used. Examples of the laminate film include a laminate film made of resin, a film in which a metal is evaporated to a laminate film made of resin and the like.

2. Method for Manufacturing all-Solid-State Battery

Figure 2:
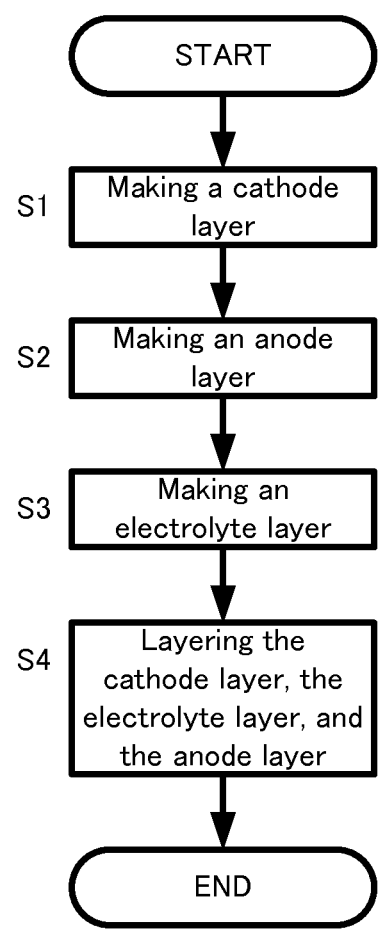
FIG. 2 is a flowchart to explain a method for manufacturing an all-solid-state battery of the present invention.
Figure 3:
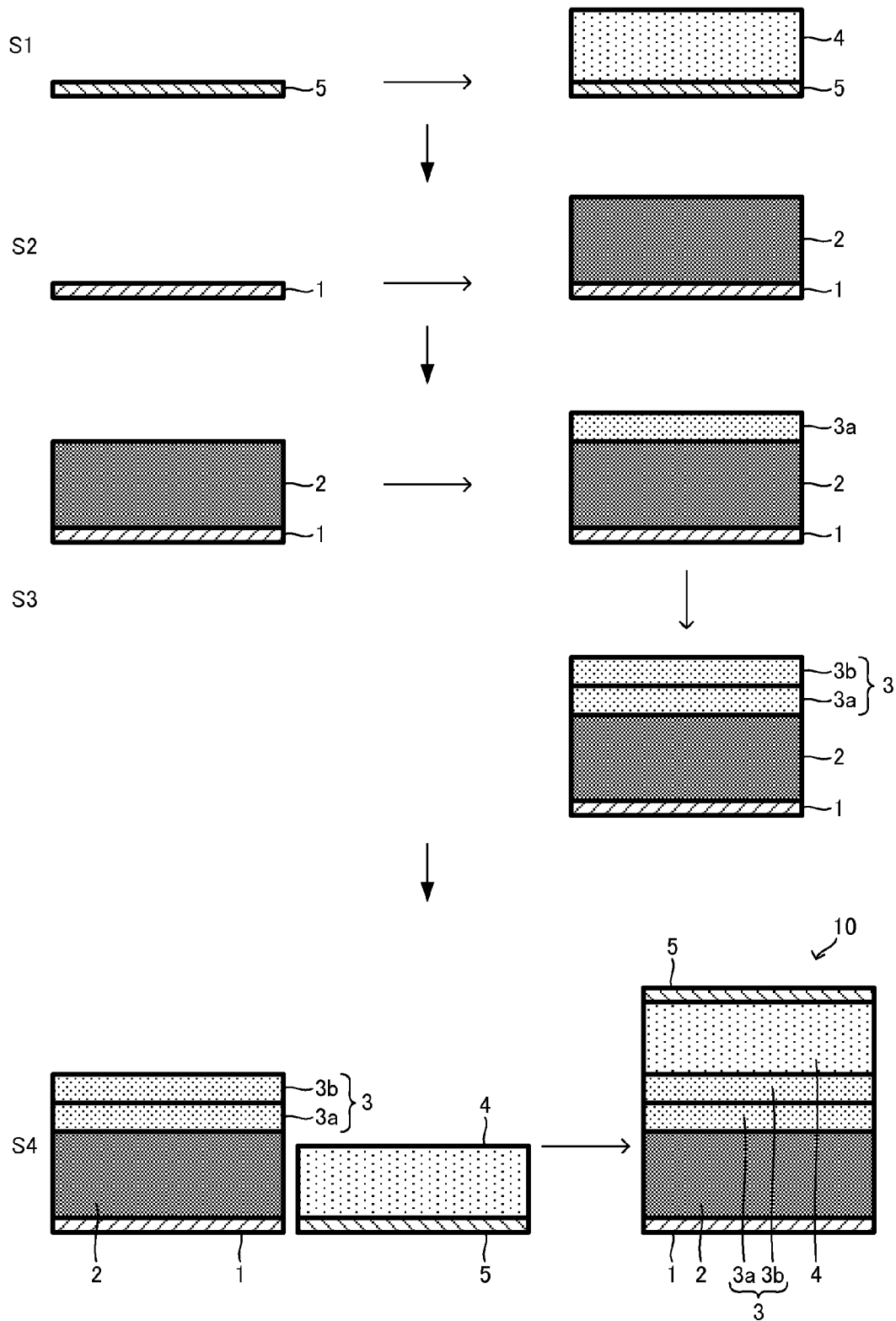
FIG. 3 is a view to explain the method for manufacturing the all-solid-state battery of the present invention.

FIG. 2 is a flowchart to explain the method for manufacturing the all-solid-state battery of the present invention (hereinafter sometimes referred to as "manufacturing method of the present invention"). FIG. 3 is a view to explain one embodiment of the manufacturing method of the present invention. Hereinafter, one embodiment of the manufacturing method of the present invention will be explained with reference to FIGS. 1 to 3.

As shown in FIG. 2, the manufacturing method of the present invention includes the steps of: making a cathode layer (S1); making an anode layer (S2); making an electrolyte layer (S3); and layering the cathode layer, the electrolyte layer, and the anode layer (S4).

The step S1 of making a cathode layer is a step of making the cathode layer to be provided to the all-solid-state battery of the present invention. In the manufacturing method of the present invention, the configuration of the step S1 is not particularly limited as long as the cathode layer to be provided to the all-solid-state battery can be made, and the step S1 may be a step of making the cathode layer by means of a known method. For example, in a case where the cathode layer 4 is made, a cathode composition in a slurry form made by adding the cathode active material, the sulfide solid electrolyte, the binder, and a conductive material to a nonpolar solvent and mixing them is applied to a surface of the cathode current collector 5 by means of a wet process such as a doctor blade method, then the resulting material is dried, whereby the cathode layer 4 may be made on the surface of the cathode current collector 5.

The step S2 of making an anode layer is a step of making the anode layer to be provided to the all-solid-state battery of the present invention. In the manufacturing method of the present invention, the configuration of the step S2 is not particularly limited as long as the anode layer to be provided to the all-solid-state battery can be made. A known method may be applied to the step S2. For example, in a case where the anode layer 2 is made, an anode composition in a slurry form made by adding the anode active material, the sulfide solid electrolyte, and the binder to a nonpolar solvent and mixing them is applied to a surface of the anode current collector 1, by means of a wet process such as a doctor blade method, then the resulting material is dried, whereby the anode layer 2 is made on the surface of the anode current collector 1.

The step S3 of making an electrolyte layer is a step of making the electrolyte layer to be provided to the all-solid-state battery of the present invention. In the manufacturing method of the present invention, the configuration of the step S3 is not particularly limited as long as the electrolyte layer including the first solid electrolyte layer and the second solid electrolyte layer that are layered can be made. A dry process such as a vapor phase growth method, and a wet process such as a doctor blade method may be applied. In view of having a configuration in which the productivity is easily improved and the like, it is preferable to employ a wet process. Configurations which can be applied to the step S3 are exemplified hereinafter.

(1) A configuration of: making the first solid electrolyte layer 3a on the surface of the anode layer 2; followed by making the second solid electrolyte layer 3b on a surface of the first solid electrolyte layer 3a made on the surface of the anode layer 2; thereby making the electrolyte layer 3 including the first solid electrolyte layer 3a and the second solid electrolyte layer 3b on the surface of the anode layer 2 (see FIG. 3).

(2) A configuration of: making each of the solid electrolyte layer and the second solid electrolyte layer on a surface of a base material; followed by transferring the first solid electrolyte layer made on the surface of the base material to a surface of the cathode layer or the anode layer (at this time, the base material is peeled off from the transferred first solid electrolyte layer); followed by transferring the second solid electrolyte layer made on the surface of the base material to a surface of the transferred first solid electrolyte layer (at this time, the base material is peeled off from the transferred second solid electrolyte layer); thereby making the electrolyte layer including the first solid electrolyte layer and the second solid electrolyte layer on the surface of the cathode layer or the surface of the anode layer.

(3) A configuration of: making each of the first solid electrolyte layer and the second solid electrolyte layer on a surface of a base material; followed by transferring the first solid electrolyte layer made on the surface of the base material to either one of the cathode layer and the anode layer (at this time, the base material is peeled off from the transferred first solid electrolyte layer); thereafter transferring the second solid electrolyte layer made on the surface of the base material to either one of the cathode layer and the anode layer, to which the first solid electrolyte layer is not transferred (at this time, the base material is peeled off from the transferred second solid electrolyte layer); after transferring one of the solid electrolyte layers (the first solid electrolyte layer or the second solid electrolyte layer. The same is applied hereinafter) to the surface of the cathode layer and transferring the other one of the solid electrolyte layers (the first solid electrolyte layer or the second solid electrolyte layer. The same is applied hereinafter) to the surface of the anode layer as above, layering, in the step S4 which is described later, the resulting layers such that one of the solid electrolyte layers made on the surface of the cathode layer and the other one of the solid electrolyte layers made on the anode layer have contact with each other; thereby making the electrolyte layer including the first solid electrolyte layer and the second solid electrolyte layer.

(4) A configuration of: making the first solid electrolyte layer on a surface of the cathode layer; followed by making the second solid electrolyte layer on a surface of the first solid electrolyte layer made on the surface of the cathode layer; thereby making the electrolyte layer including the first solid electrolyte layer and the second solid electrolyte layer on the surface of the cathode layer.

(5) A configuration of: making the first solid electrolyte layer on a surface of the anode layer and the second solid electrolyte layer on a surface of the cathode layer; thereafter, in the step S4 which is described later, layering the resulting layers such that the first solid electrolyte layer made on the surface of the anode layer and the second solid electrolyte layer made on the surface of the cathode layer have contact with each other; thereby making the electrolyte layer including the first solid electrolyte layer and the second solid electrolyte layer.

In the manufacturing method of the present invention, the configuration in which the first solid electrolyte layer and the second solid electrolyte layer are made to the substance selected from the group consisting of the cathode layer, the anode layer, and the base material is not particularly limited, and a known method can be adequately employed. The first solid electrolyte layer 3a can be made for example by: applying an electrolyte composition in a slurry form made by adding the binder and the sulfide solid electrolyte powder to a nonpolar solvent and mixing them, to a base material, by means of a wet process such as a doctor blade method; thereafter drying the resulting composition. Similarly, the second solid electrolyte layer 3b may be made for example by: applying an electrolyte composition in a slurry form made by adding the binder and the sulfide solid electrolyte powder to a nonpolar solvent and mixing them, to a base material, by means of a wet process such as a doctor method; thereafter drying the resulting composition.

The step S4 is a step of layering the cathode layer, the electrolyte layer, and the anode layer such that the electrolyte layer is arranged between the cathode layer and the anode layer. After layering the layers as described above, by going through the process of housing the resulting layer in a housing such as a laminate film, the all-solid-state battery of the present invention can be manufactured.

According to the manufacturing method of the present invention including the above-described steps, it is possible to manufacture the all-solid-state battery 10. Therefore, according to the present invention, it is possible to provide the method for manufacturing the all-solid-state battery capable of manufacturing an all-solid-state battery which can inhibit a short circuit together with reducing the resistance.

In the above explanation regarding the manufacturing method of the present invention, the configuration in which the step of making a cathode layer is followed by the step of making an anode layer is exemplified. However, the manufacturing method of the present invention is not limited to this configuration. The manufacturing method of the present invention has a configuration in which the step of making an anode layer is followed by the step of making a cathode layer.

Also, in the above explanation regarding the present invention, the configuration in which a sulfide solid electrolyte powder is used is exemplified. However, the present invention is not limited to this configuration. However, in view of having a configuration in which the manufacturing cost is easily reduced, a configuration in which the productivity is easily improved and the like, it is preferable to have the configuration in which the sulfide solid electrolyte powder is used.

Also, in the above explanation regarding the present invention, the configuration in which the binder is used for the first solid electrolyte layer and the second solid electrolyte layer is exemplified. The present invention is not limited to this configuration. However, in a case where the sulfide solid electrolyte powder is used, in view of having a configuration in which the resistance is easily reduced by inhibiting the variation of the sulfide solid electrolyte powder and the like, it is preferable to use the binder with the sulfide solid electrolyte powder.

Also, in the above explanation regarding the present invention, the configuration in which $X/Y \leq 0.5$, wherein X is the average particle diameter D50 of the sulfide solid electrolyte, and Y is the thickness of the electrolyte layer is exemplified. The present invention is not limited to this configuration. However, in view of having a configuration in which a short circuit is easily inhibited and the like, it is preferable that the average particle diameter D50 of the sulfide solid electrolyte and/or the thickness of the electrolyte layer are adjusted so as to satisfy $X/Y \leq 0.5$.

Also, in the above explanation regarding the present invention, a configuration in which the electrolyte layer has two solid electrolyte layers (the first solid electrolyte layer and the second solid electrolyte layer) is exemplified. However, the present invention is not limited to this configuration. The present invention can have a configuration in which the electrolyte layer includes 3 or more of solid electrolyte layers.

Also, in the above explanation regarding the present invention, the configuration in which the all-solid-state battery is a lithium-ion secondary battery is exemplified. However, the present invention is not limited to this configuration. The all-solid-state battery of the present invention and the all-solid-state battery manufactured by the manufacturing method of the present invention can have a configuration in which ions other than lithium-ions transfer between the cathode layer and the anode layer. Examples of the ions include sodium ions, magnesium ions and the like. In a case where ions other than lithium ions transfer, the cathode active material, the sulfide solid electrolyte, and the anode active material may be accordingly chosen depending on the ions to transfer.

Also, as described above, in the present invention, a configuration in which the sulfide solid electrolyte is used for the first solid electrolyte layer, the second solid electrolyte layer and the like is assumed. However, even in a case where an oxide solid electrolyte, a nitride solid electrolyte, or a halide solid electrolyte is used instead of the sulfide solid electrolyte, it can be considered that a similar effect as the above effect by the present invention can be exerted.

EXAMPLES

Sample Preparation

Example 1

1) Cathode Layer

A cathode active material ($LiNi_{1/3}CO_{1/3}Mn_{1/3}O_2$), a sulfide solid electrolyte ($75Li_2S\text{-}25P_2S_5$. The same is applied hereinafter), conductive material (vapor growth carbon fiber, manufactured by SHOWA DENKO K.K.), and a binder (butylenes rubber, manufactured by JSR Corporation. The same is applied hereinafter) were weighed such that their weight ratio was: cathode active material:sulfide solid electrolyte:conductive material:binder=100:33.5:3:1.5, and mixed, whereby a cathode mixture was made.

In inert gas (argon gas. The same is applied hereinafter), a cathode composition in a slurry form was made by mixing the cathode mixture and a solvent (heptane, manufactured by KANTO CHEMICAL CO., INC. The same is applied hereinafter). The obtained cathode composition was applied to a cathode current collector (aluminum foil) by means of a doctor blade method, then dried, whereby a cathode layer was made on the cathode current collector.

2) Anode Layer

An anode active material (natural carbon), the sulfide solid electrolyte, and the binder were weighed such that their weight ratio was: anode active material:sulfide solid electrolyte:binder=100:73:1.1, and mixed, whereby an anode mixture was made.

In inert gas, an anode composition in a slurry form was made by mixing the anode mixture and a solvent. Then, the anode composition was applied to an anode current collector (copper foil) by means of a doctor blade method, then dried, whereby an anode layer was made on the anode current collector.

3) First Solid Electrolyte Layer and Second Solid Electrolyte Layer

The sulfide solid electrolyte and the binder were weighed such that their weight ratio was: sulfide solid electrolyte:binder=100:1, and mixed, whereby an electrolyte material was made. As the sulfide solid electrolyte, a solid electrolyte powder having an average particle diameter D50 of 4 µm was used.

In inert gas, an electrolyte composition in a slurry form was made by mixing the electrolyte material and a solvent. Then the electrolyte composition was applied to a base material (aluminum foil) by means of a doctor blade method and dried, whereby each of the first solid electrolyte layer and the second solid electrolyte layer was made on the base material. The first solid electrolyte layer and the solid electrolyte layer had a same thickness.

4) Preparation of all-Solid-State Battery

In inert gas, the anode layer and the first solid electrolyte layer were punched out in a size of 1 cm², and pressed at a pressure of 98 MPa in a state of being overlapped with each other in a manner to have contact with each other. Then, the base material in contact with the first solid electrolyte layer was peeled, whereby the first solid electrolyte layer was arranged (transferred) on a surface of the anode layer. Next, the second solid electrolyte layer was punched out in a size of 1 cm², and pressed at a pressure of 98 MPa in a state of being overlapped with the first solid electrolyte layer arranged on the anode layer in a manner to have contact with it. Then, the base material in contact with the second solid electrolyte layer was peeled, whereby the second solid electrolyte layer was arranged (transferred) on a surface of the first solid electrolyte layer. Whereby, the electrolyte layer including the first solid electrolyte layer and the second solid electrolyte layer was arranged on the surface of the anode layer. Next, the cathode layer was punched out in a size of 1 cm², and pressed at a pressure of 421 MPa in a state of being layered with the second solid electrolyte layer such that the second solid electrolyte layer and the cathode layer have contact with each other, whereby an all-solid-state battery (the all-solid-state battery of Example 1) as shown in FIG. 1 was made. The thickness of the electrolyte layer provided to the solid battery of Example 1 (the total thickness of the first solid electrolyte layer and the second solid electrolyte layer. The same is applied hereinafter except Comparative Examples) was 10 µm.

Example 2

With the same material and the same method as in Example 1, the cathode layer, the anode layer, the first solid electrolyte layer, and the second solid electrolyte layer were made. Thereafter, in inert gas, the cathode layer and the first solid electrolyte layer were punched out in a size of 1 cm², and pressed at a pressure of 98 MPa in a state of being overlapped with each other in a manner to have contact with each other. Thereafter the base material in contact with the first solid electrolyte layer was peeled, whereby the first solid electrolyte layer was arranged on the surface of the cathode layer. Next, the second solid electrolyte layer was punched out in a size of 1 cm², and pressed at a pressure of 98 MPa in a state of being overlapped with each other in a manner to have contact with each other. Thereafter the base material in contact with the second solid electrolyte layer was peeled, whereby the second solid electrolyte layer was arranged on a surface of the first solid electrolyte layer. Whereby, the electrolyte layer including the first solid electrolyte layer and the second solid electrolyte layer was arranged on the surface of the cathode layer. Next, the anode layer was punched out in a size of 1 cm², and pressed at a pressure of 421 MPa in a state of being layered with the second solid electrolyte layer such that the second solid electrolyte layer and the anode layer have contact with each other, whereby an all-solid-state battery (the all-solid-state battery of Example 2) was made. The thickness of the electrolyte layer provided to the all-solid-state battery of Example 2 was 10 µm.

Example 3

An all-solid-state battery of Example 3 was made in the same conditions as in making the all-solid-state battery of Example 1, except that a sulfide solid electrolyte powder having an average particle diameter D50 of 2.5 µm was used and the thickness of the electrolyte after the second solid electrolyte layer and the cathode layer were layered so as to have contact with each other and pressed was 5 µm.

Comparative Example

An all-solid-state battery of Comparative Example was made in the same conditions as in making the all-solid-state battery of Example 1, except that the second solid electrolyte layer was not made and the thickness of the electrolyte layer (=the first solid electrolyte layer) after the first solid electrolyte and the cathode layer were layered so as to have contact with each other was 30 µm.

<Performance Evaluation>

The all-solid-state batteries of Examples 1, 2, and 3 (hereinafter sometimes the batteries are collectively referred to as "the all-solid-state batteries of Examples") and the all-solid-state battery of Comparative Example was pressed at a pressure of 44.1 MPa in inert gas, thereafter put in an airproof container, then the performance of the batteries was evaluated. Each all-solid-state battery was subjected to 1 cycle of charging and discharging at 0.1 C rate and constant current and voltage (constant voltage end condition: 1/200 C) within a voltage range of 4.2V to 2.5V. Thereafter each of the all-solid-state batteries was charged at 0.1 C rate and at constant current and voltage to 4.2V. The performance evaluation of the batteries was carried out by examining whether the voltage was maintained or not after each of the batteries was left for 24 hours.

<Result>

Figure 4:
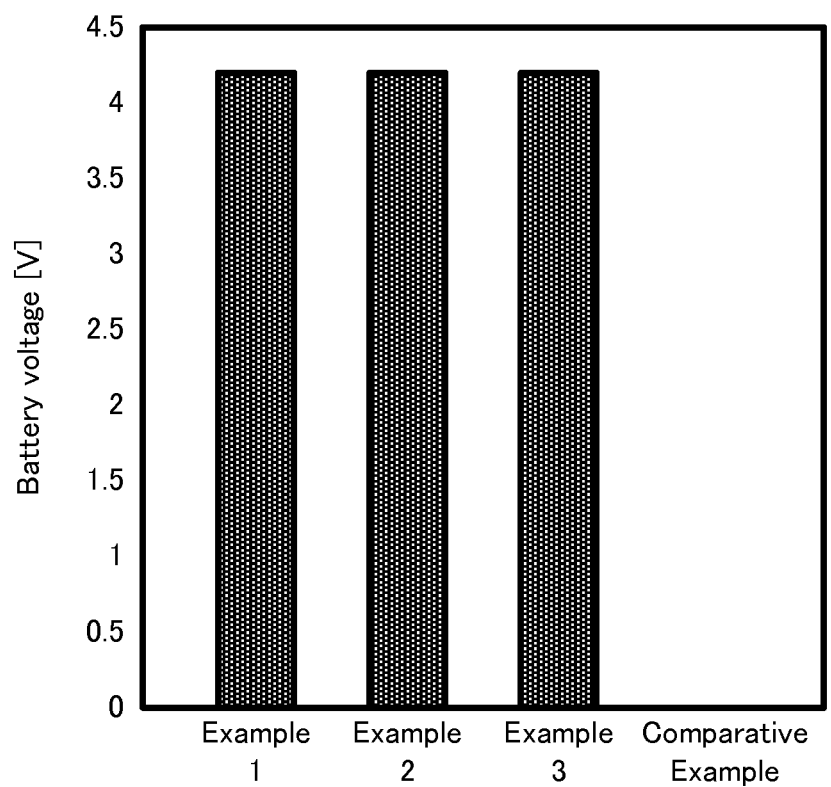
FIG. 4 is a view to show performance evaluation results of all-solid-state batteries.

The performance evaluation results are shown in FIG. 4. As shown in FIG. 4, each of the all-solid-state batteries of Examples had a voltage of 4.2V, which means the voltage was maintained. However, the voltage of the all-solid-state battery of Comparative Example was 0V, which means the voltage was not maintained. That is, even though the thickness of the electrolyte layer was larger than that of the all-solid-state batteries of Examples, an internal short circuit of battery was occurred in the all-solid-state battery of Comparative Example which did not include a plurality of solid electrolyte layers between the cathode layer and the anode layer. In contrast, it was possible to prevent a short circuit in the all-solid-state batteries of Examples including a plurality of solid electrolyte layers between the cathode layer and the anode layer. From the above results, it was shown that, according to the present invention, it was possible to prevent a short circuit even if the electrolyte layer was thinly made in order to reduce the resistance.

Also, a same performance evaluation was carried out to a battery made in the same conditions as in making the all-solid-state battery of Example 1, except that a sulfide solid electrolyte powder having an average particle diameter D50 of 4 μm was used and the thickness of the electrolyte layer after the second solid electrolyte layer and the cathode layer were layered so as to have contact with each other and pressed was 8 μm. As a result, the voltage after the battery was left for 24 hours was 4.2V. Therefore, it was confirmed that, even if X/Y=0.5, wherein X is the average particle diameter D50 of the sulfide solid electrolyte, and Y is the thickness of the electrolyte layer, it is possible to prevent a short circuit.

DESCRIPTION OF THE REFERENCE NUMERALS

1 anode current collector
2 anode layer
3 electrolyte layer
3a first solid electrolyte layer
3b second solid electrolyte layer
4 cathode layer
5 cathode current collector
10 all-solid-state battery

The invention claimed is:

1. An all-solid-state battery comprising:
   a cathode layer;
   an anode layer; and
   an electrolyte layer arranged between the cathode layer and the anode layer,
   the electrolyte layer comprising:
      a first solid electrolyte layer comprising a sulfide solid electrolyte; and
      a second solid electrolyte layer other than the first solid electrolyte layer, the second solid electrolyte layer comprising the sulfide solid electrolyte,
   wherein the first solid electrolyte layer is in direct contact with the anode layer and the second solid electrolyte layer, and
   the second solid electrolyte layer is in direct contact with the first solid electrolyte layer and the cathode layer.

2. The all-solid-state battery according to claim 1, wherein the sulfide solid electrolyte is a powder.

3. The all-solid-state battery according to claim 2, wherein the first solid electrolyte layer and/or the second solid electrolyte layer comprise a binder.

4. The all-solid-state battery according to claim 2, wherein $$X/Y \leq 0.5$$

wherein X is the average particle diameter D50 of the sulfide solid electrolyte, and Y is the thickness of the electrolyte layer.

5. A method for manufacturing an all-solid-state battery, the method comprising the steps of:
   (a) making a cathode layer,
   (b) making an anode layer,
   (c) making an electrolyte layer comprising: a first solid electrolyte layer comprising a sulfide solid electrolyte; and a second solid electrolyte layer comprising the sulfide solid electrolyte; and
   (d) layering the cathode layer, the electrolyte layer, and the anode layer, such that (i) the electrolyte layer is arranged between the cathode layer and the anode layer, (ii) the first solid electrolyte layer is in direct contact with the anode layer and the second solid electrolyte layer, and (iii) the second solid electrolyte layer is in direct contact with the first solid electrolyte layer and the cathode layer.

6. The method for manufacturing an all-solid-state battery according to claim 5, wherein the sulfide solid electrolyte is a powder.

7. The method for manufacturing an all-solid-state battery according to claim 6, wherein a binder is used when making the first solid electrolyte layer and/or when making the second solid electrolyte layer.

8. The method for manufacturing an all-solid-state battery according to claim 6, wherein the average particle diameter D50 of the sulfide solid electrolyte and/or the thickness of the electrolyte layer are adjusted such that $$X/Y \leq 0.5$$

wherein X is the average particle diameter D50 of the sulfide solid electrolyte, and Y is the thickness of the electrolyte layer after the step (d).

* * * * *